(12) United States Patent
Thygesen

(10) Patent No.: US 9,789,800 B2
(45) Date of Patent: Oct. 17, 2017

(54) RETRACTABLE CARGO BOX ASSEMBLY FOR A TRUCK CARGO BED

(71) Applicant: Mark Thygesen, Edmonton (CA)

(72) Inventor: Mark Thygesen, Edmonton (CA)

( * ) Notice: Subject to any disclaimer, the term of this patent is extended or adjusted under 35 U.S.C. 154(b) by 0 days.

(21) Appl. No.: 14/886,752

(22) Filed: Oct. 19, 2015

(65) Prior Publication Data

US 2016/0107560 A1     Apr. 21, 2016

Related U.S. Application Data

(60) Provisional application No. 62/065,272, filed on Oct. 17, 2014.

(51) Int. Cl.
*B60P 1/52* (2006.01)
*B62D 33/08* (2006.01)
*B60R 5/04* (2006.01)

(52) U.S. Cl.
CPC ............... *B60P 1/52* (2013.01); *B60R 5/04* (2013.01); *B60R 5/041* (2013.01); *B62D 33/08* (2013.01)

(58) Field of Classification Search
CPC ..... B60P 1/52; B60R 5/04; B62D 33/08; B62R 5/041
See application file for complete search history.

(56) References Cited

U.S. PATENT DOCUMENTS

| | | | | |
|---|---|---|---|---|
| 5,934,725 A * | 8/1999 | Bowers | ..................... | B60P 3/40 296/26.09 |
| 6,065,792 A * | 5/2000 | Sciullo | .................... | B60P 1/003 296/26.09 |
| 6,705,656 B2 * | 3/2004 | Keller | ..................... | B60P 1/003 224/402 |
| 7,090,275 B2 | 8/2006 | Pero | | |

* cited by examiner

*Primary Examiner* — Glenn Dayoan
*Assistant Examiner* — Melissa A Black
(74) *Attorney, Agent, or Firm* — Woods Oviatt Gilman LLP; Dennis B. Danella, Esq.

(57) ABSTRACT

Disclosed herein is a retractable cargo box assembly for a cargo bed of a vehicle. The retractable cargo box assembly includes a cargo box. The cargo box includes a base extending laterally between a first side and a second side, and extending longitudinally between a front end and a rear end. A linear wheel assembly is mounted to the base. The linear wheel assembly includes a plurality of rollers aligned in a linear arrangement between the front end and the rear end of the base. The rollers are configured to rotatably support the cargo box on the cargo bed of the vehicle between a retracted position and an extended position.

20 Claims, 5 Drawing Sheets

RETRACTABLE CARGO BOX ASSEMBLY FOR A TRUCK CARGO BED

RELATED APPLICATIONS

This application claims the benefit of U.S. provisional patent application Ser. No. 62/065,272 filed Oct. 17, 2014 and entitled RETRACTABLE CARGO BOX ASSEMBLY FOR A TRUCK CARGO BED, the entire contents of which are hereby incorporated by reference herein for all purposes.

TECHNICAL FIELD

The embodiments disclosed herein relate to cargo boxes for use on cargo beds of vehicles, and in particular, to retractable cargo boxes for pickup trucks and other vehicles having cargo beds.

INTRODUCTION

The following paragraphs are not an admission that anything discussed in them is prior art or part of the knowledge of persons skilled in the art.

Pickup trucks and other similar vehicles often have an open-top cargo area or "cargo bed" which may be used for hauling loads (e.g. construction materials, furniture, tools, etc.). Usually, the cargo bed is located at the rear of the truck behind a cab where the driver and any passengers may sit.

The cargo bed is often enclosed around its perimeter with side rail body panels that extend upwardly from the floor of the bed, and a similar front body panel that extends upwardly from the floor near the front of the bed. Often, a hinged rear tailgate is provided at the rear of the bed so that the bed may be enclosed around its perimeter to help secure cargo therein.

Cargo boxes are sometime placed within the cargo bed. These cargo boxes can be helpful to organize and store tools, tool boxes, and other items within the cargo bed.

U.S. Pat. No. 7,090,275 (Pero) discloses a cargo box having a folding first side that is configured to be placed within the rear portion of a pickup truck, and to be held against the tailgate of the pickup while the tailgate is closed. The cargo box is configured to be rolled along the bed of the pickup and rolled out of the rear of the pickup over the top of the tailgate when the tailgate is open and placed in a downward position. The cargo box contains a stopping device that prevents the device from being pulled too far forward out of the rear portion of the pickup truck, or being pushed too far into the bed portion of the pickup truck.

SUMMARY

According to some embodiments, there is a retractable cargo box assembly for a cargo bed of a vehicle. The retractable cargo box assembly includes a cargo box. The cargo box includes a base extending laterally between a first side and a second side, and extending longitudinally between a front end and a rear end. A linear wheel assembly is mounted to the base. The linear wheel assembly includes a plurality of rollers aligned in a linear arrangement between the front end and the rear end of the base. The rollers are configured to rotatably support the cargo box on the cargo bed of the vehicle between a retracted position and an extended position.

Each roller may have a roller diameter, and each roller may be spaced apart in the linear arrangement by a separation distance that is less than the roller diameter.

The plurality of rollers may include at least three rollers aligned in a linear arrangement.

The rollers of the linear wheel assembly may be aligned along a longitudinal axis and each roller may have a rotational axis orthogonal to the longitudinal axis.

The linear wheel assembly may include a plurality of linear wheel assemblies. For example, the plurality of linear wheel assemblies may include a first linear wheel assembly positioned below the base adjacent the first side, and a second linear wheel assembly positioned below the base adjacent the second side. The retractable cargo box assembly may also include a third linear wheel assembly positioned laterally between the first linear wheel assembly and the second linear wheel assembly.

The base of the cargo box may include a roller channel extrusion having a roller channel for receiving the linear wheel assembly therein.

The retractable cargo box assembly may include a guide securable to the cargo bed for guiding the cargo box between the retracted position and the extended position. The guide may include a guide flange for securing the cargo box and the linear wheel assembly to the cargo bed. Furthermore, the guide may include a baseplate securable to the cargo bed, and a guide bracket securable to the baseplate and extending upwardly therefrom. The guide bracket includes the guide flange.

The baseplate may be laterally adjustable along the cargo bed.

The cargo box may include a rail that engages the guide flange.

The guide may include a first guide along the first side of the cargo box, and a second guide along the second side of the cargo box.

The retractable cargo box assembly may include a retraction stop component for restricting movement of the cargo box beyond the retracted position. The guide may engage the retraction stop component in the retracted position. The retraction stop component may include a set of rear tabs protruding outwardly from the first and second sides of the cargo box adjacent the rear end of the cargo box.

The retractable cargo box assembly may include an extension stop component for restricting movement of the cargo box beyond the extended position. The guide may engage the extension stop component in the extended position. The extension stop component may include a set of front tabs protruding outwardly from the first and second sides of the cargo box adjacent the front end of the cargo box.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. It is possible that an apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

Figure 1:
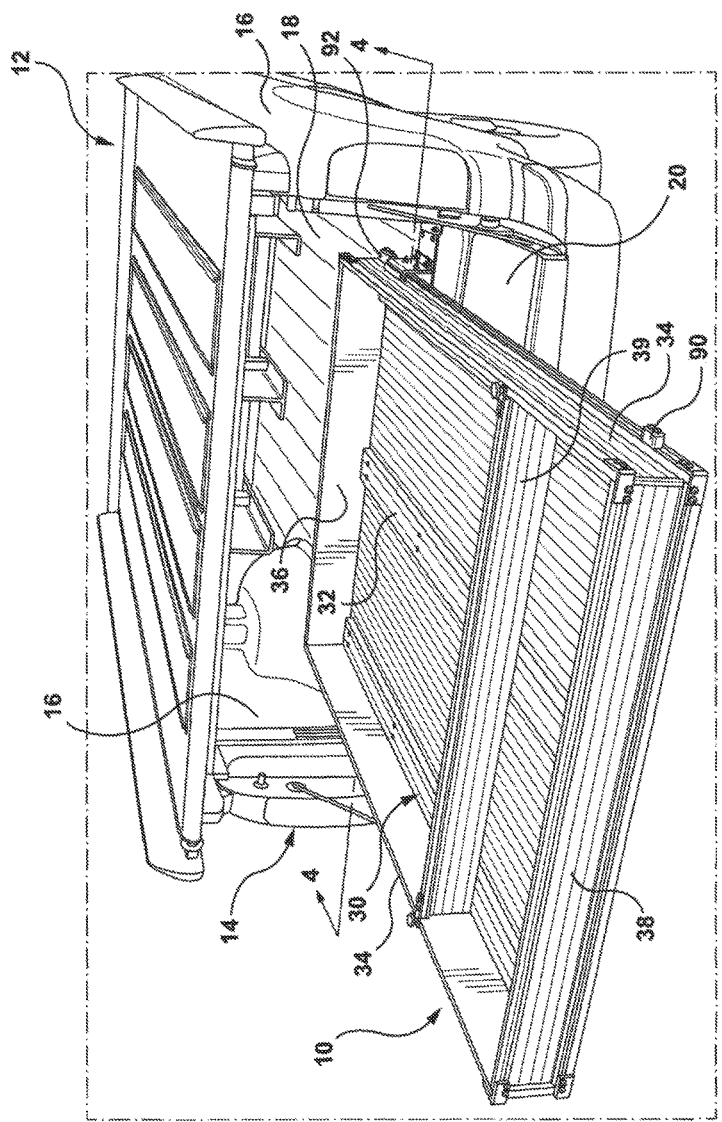
FIG. 1 is a rear perspective view of a truck with a retractable cargo box assembly shown in an extended position.
Figure 2:
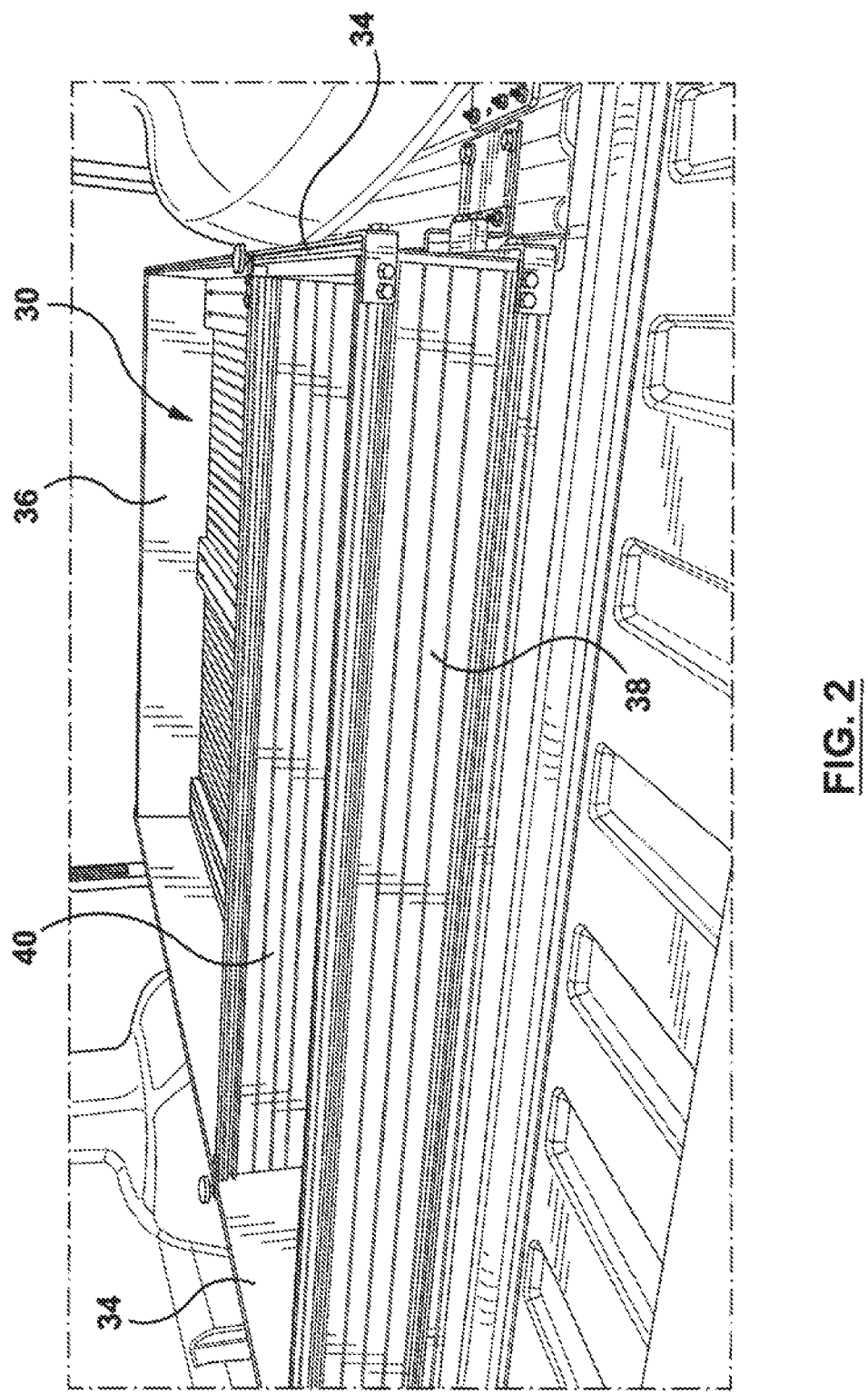
FIG. 2 is a rear perspective view of the retractable cargo box assembly of FIG. 1 shown in a retracted position.

Referring to FIGS. 1 and 2, illustrated therein is a retractable cargo box assembly 10 configured to be mounted to a vehicle 12 that has a cargo bed 14 (e.g. a pickup truck).

The cargo bed 14 has side rails 16 that extend upwardly from a floor 18 of the cargo bed 14. As shown, a tailgate 20 is coupled to the vehicle 12. In particular, the tailgate 20 may be hingedly coupled to a rear end of the cargo bed 14. The tailgate 20 can be used for closing off the rear end of the cargo bed 14. The vehicle 12 may also include a cab in front of the cargo bed 14 where the driver and passengers can sit.

The cargo box assembly 10 includes a cargo box 30 that is movable between an extended position (shown in FIG. 1) and a retracted position (shown in FIG. 2). The cargo box 30 includes a base 32 that extends laterally between two sides 34, and extends longitudinally between a front end 36 and a rear end 38. The cargo box 30 may include sidewalls that define a cargo space within the sides 34, front end 36, and rear end 38.

The base 32 and sidewalls may be assembled from extrusion profiles, which may be made of metal such as aluminum or another suitable material. The cargo box 30 may also include one or more dividers 39 for sub-dividing the cargo space. As shown, the cargo space may have an open top. In other embodiments, the cargo space may be closed by a lid or top wall.

Figure 3:
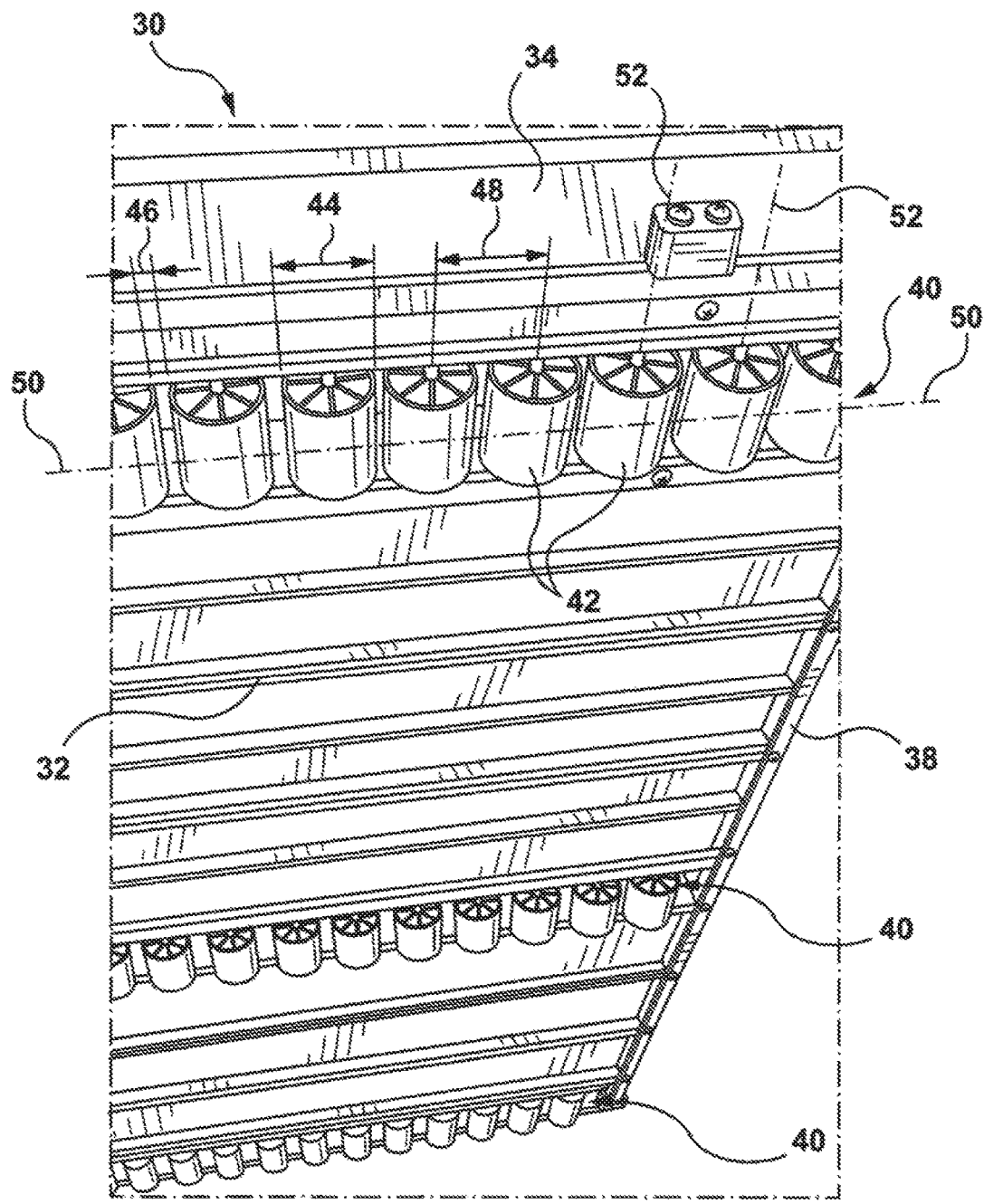
FIG. 3 is a bottom perspective view of the retractable cargo box assembly of FIG. 1 showing linear wheel assemblies for rolling along a cargo bed of the truck.
Figure 4:
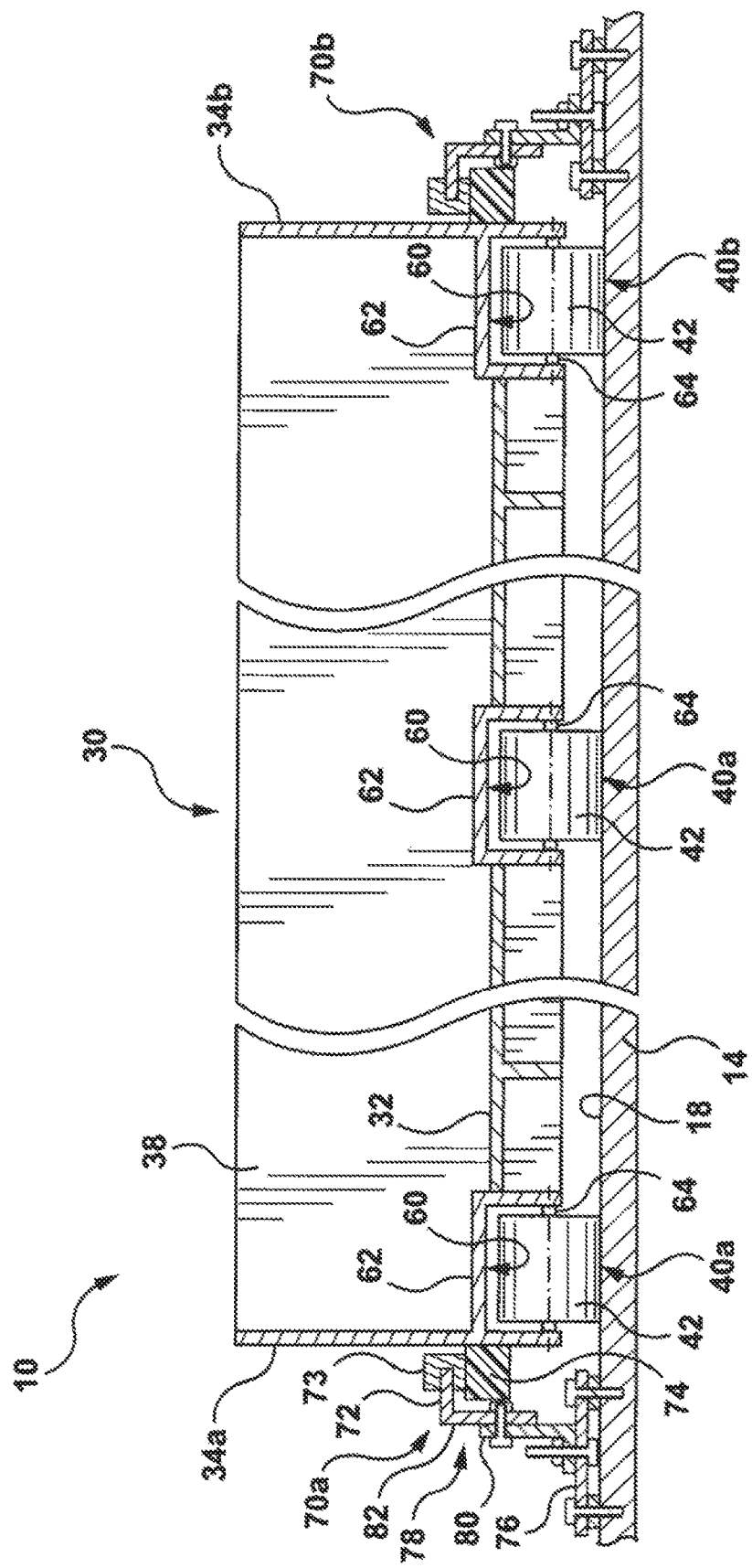
FIG. 4 is a cross-sectional view of the retractable cargo box assembly of FIG. 1 taken along line 4-4.

Referring now to FIGS. 3 and 4, the cargo box assembly 10 includes one or more linear wheel assemblies 40 mounted to the base 32 of the cargo box 30. The linear wheel assemblies 40 allow the cargo box 30 to roll along the floor 18 of the cargo bed 14.

With reference to FIG. 3, in this embodiment each linear wheel assembly 40 includes a plurality of rollers 42 aligned in a linear arrangement between the front end 36 (not shown in FIG. 3) and the rear end 38 of the cargo box 30. For example, the rollers 42 within each linear wheel assembly 40 may be aligned along a respective longitudinal axis 50, and each roller 42 may have a rotational axis 52 generally orthogonal to the longitudinal axis 50. The rollers 42 are configured to rotatably support the cargo box 30 on the cargo bed 14 of the vehicle 12 as it moves between the retracted position and the extended position.

As shown in FIG. 3, each linear wheel assembly 40 includes a plurality of rollers 42. For example, each linear wheel assembly 40 includes at least three rollers 42, and in some embodiments there are more than three rollers 42 in each linear wheel assembly 40. The total number of rollers 42 may depend on the overall length of the cargo box 30, and may be selected based on a desired spacing between each roller 42, particularly to encourage smooth movement of the cargo box 30.

For example, each roller 42 has a roller diameter 44. Furthermore, each roller 42 may be spaced apart in linear arrangement with the other rollers 42 by a separation distance 46 that is less than the roller diameter 44. Stated another way, the rollers 42 may have a roller spacing 48 that is less than twice the roller diameter 44. In some cases, the roller spacing 48 may be slightly larger than the roller diameter 44. In some case, the roller spacing 48 may be approximately equal to the roller diameter 44 so that the separation 46 becomes quite small.

The spacing of the rollers 42 may help support the cargo box 30 while being rolled along the cargo bed 14. Moreover, the spacing of the rollers 42 may encourage smooth movement, particularly while the cargo box 30 is rolled over a gap between the floor 18 and the tailgate 20. Having a plurality of rollers 42 may also help support the cargo box while hanging beyond the tailgate in a cantilever fashion (e.g. as shown in FIG. 1). Specifically, some of the rollers 42 may still engage the floor 18 while other rollers 42 hang beyond the tailgate 20.

In some embodiments, the roller diameter 44 may be 45-millimeters, and the roller spacing 48 may be 50-millimeters, which may provide a separation distance 46 of approximately 5-millimeters. In other embodiments, the roller dimensions and/or spacing may be larger or smaller.

While each linear wheel assembly 40 includes a plurality of rollers 42, there may also be a plurality of linear wheel assemblies 40 mounted to the base 32 of the cargo box 30. For example, as shown in FIG. 4, there may be a pair of linear wheel assemblies, which may include a first linear wheel assembly 40a positioned below the base 32 adjacent a first side 34a of the cargo box 30, and a second linear wheel assembly 40b positioned below the base 32 adjacent a second side 34b of the cargo box 30. There may also be a third linear wheel assembly 40c positioned laterally between the first linear wheel assembly 40a and the second linear wheel assembly 40b.

In other embodiments, there may be a greater or fewer number of linear wheel assemblies.

Referring still to FIG. 4, the base 32 of the cargo box 30 may include one or more roller channels 60 for receiving the linear wheel assemblies 40a, 40b, 40c. Each roller channel 60 may be defined by a roller channel extrusion 62, which may be secured to other extrusion profiles used to assemble the cargo box 30. The rollers 42 may have axles 64 secured to the roller channel extrusions 62.

Figure 5:
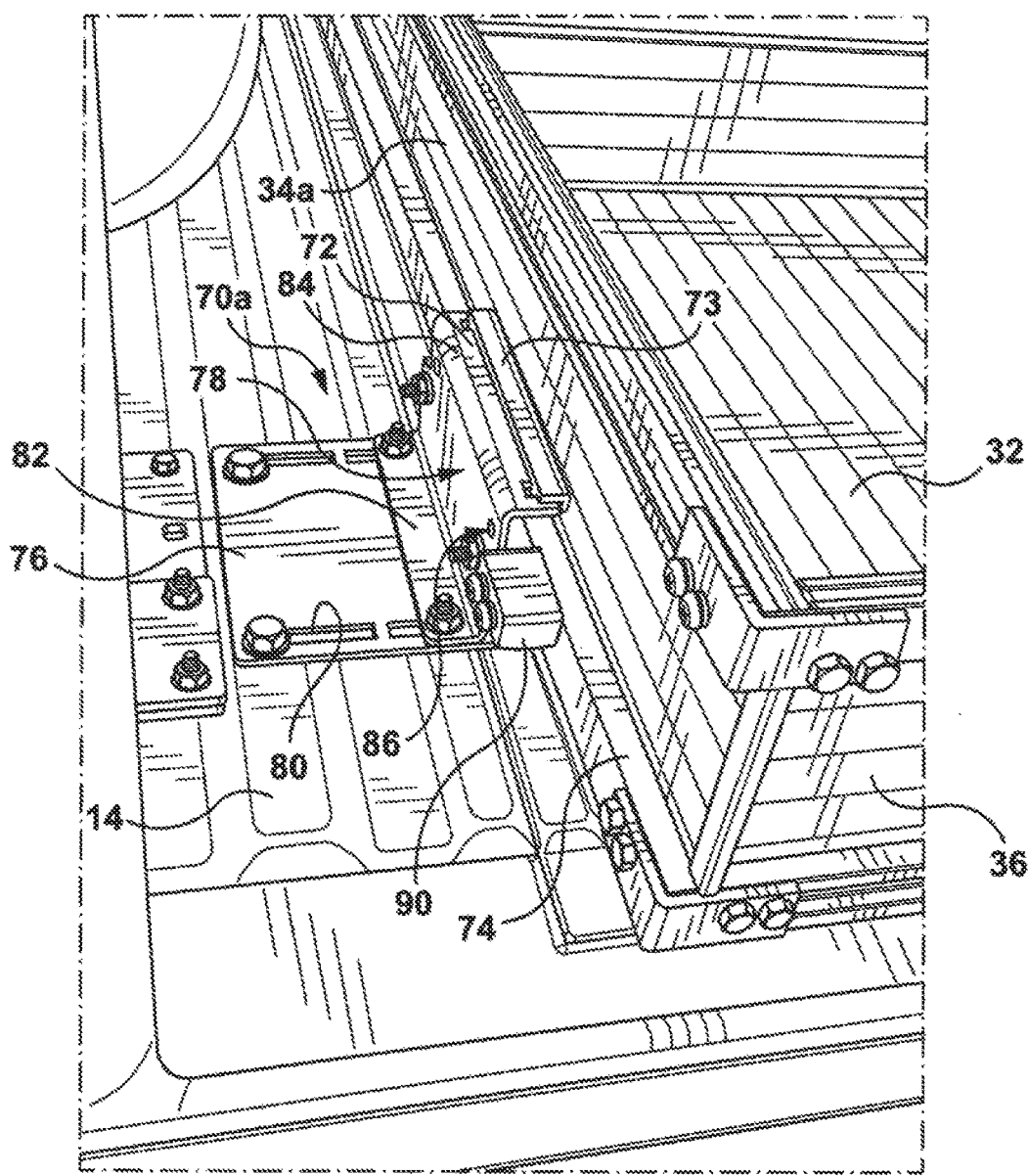
FIG. 5 is a rear perspective top view of a guide secured to the cargo bed for guiding the cargo box between the extended and retracted positions.

With reference now to FIGS. 4 and 5, the cargo box assembly 10 may include one or more guides 70a, 70b securable to the cargo bed 14 for guiding the cargo box 30 between the retracted position and the extended position. As shown in FIG. 4, there may be a first guide 70a on the first side 34a of the cargo box 30, and a second guide 70b on the second side 34b of the cargo box 30. Construction of the guides 70a, 70b will be described below with reference to the first guide 70a. The second guide 70b may have a similar configuration as the first guide 70a.

The guide 70a may include a guide flange 72 for securing or holding down the cargo box 30 and the linear wheel assemblies 40 against the cargo bed 14. For example, the cargo box 30 may include a rail 74 and the guide flange 72 may overhang and engage the rail 74 (or another bearing surface on the cargo box 30). In some cases, the guide flange 72 may include a low-friction clip 73 or other low-friction member to facilitate sliding movement of the guide 70a along the rail 74. The low-friction clip 73 may be made from ultra-high molecular weight polyethylene, polytetrafluoroethylene, nylon, or other low-friction materials. The guide flange 72 and the rail 74 may cooperate to help support the cargo box 30 while hanging beyond the tailgate 20 in the extended position.

As shown, the guide 70a may include a baseplate 76 securable to the cargo bed 14 (e.g. the floor 18), and a guide bracket 78 securable to the baseplate 76. The guide bracket 78 extends upwardly from the baseplate 76 and includes the guide flange 72, which overhangs the rail 74 (or another bearing surface on the cargo box 30).

In some embodiments, the baseplate 76 may be laterally adjustable along the cargo bed 14. For example, as shown in FIG. 5, the baseplate 76 may include one or more lateral slots 80 for receiving screws, bolts, or other fasteners to mount the guide 70a to the cargo bed 14. The lateral slots 80 may allow the baseplate 76 to be shifted laterally to a desired position, and then secured in place using the fasteners. In some cases, the lateral slots may help to position bolt heads and other fasteners within valleys along the floor 18 of the cargo bed 14.

As shown in FIG. 4, washers or spacers (e.g., shims and the like) may be placed between the baseplate 76 and the floor 18. This may help level the base plate along the floor 18, particularly when the floor is undulated with ridges and valleys.

In some embodiments, the guide bracket 78 may be configured to provide an adjustable height. For example, the guide bracket 78 may include a lower angle bracket 82 that is secured to the baseplate 76, and an upper angle bracket 84 that includes the guide flange 72. The lower angle bracket 82 and/or the upper angle bracket 84 may include one or more vertical slots 86 for receiving screws, bolts, or other fasteners to secure the angle brackets 82, 84 together. The vertical slots 86 allow the upper angle bracket 84 to be shifted vertically to a desired position, and then secured in place using the fasteners.

Providing the guide 70a with adjustable lateral and vertical positions can help facilitate the use of the cargo box assembly 10 with cargo beds and tailgates having different shapes, sizes, and configurations.

In some embodiments, the cargo box assembly 10 may include one or more stop components for restricting movement of the cargo box 30. For example, in FIG. 5, there is a retraction stop component 90 for restricting movement of the cargo box 30 beyond the retracted position. The retraction stop component 90 may include one or more rear tabs protruding outwardly from the first and/or second sides 34a, 34b of the cargo box 30 adjacent the rear end of the cargo box 30. In use, the guide 70a may engage the retraction stop component 90 in the retracted position, which may restrict or prevent further movement of the cargo box 30 into the cargo bed 14.

Furthermore, the retraction stop component 90 may be positioned along the floor 18 of the cargo bed 14 so that once the tailgate 20 has been closed, the cargo box 32 is adjacent the tailgate 20 (e.g. pressing against the tailgate). This may help secure the cargo box 30 while driving and reduce or inhibit unintentional movement.

Referring to FIG. 1, the cargo box assembly 10 may include an extension stop component 92 for restricting movement of the cargo box 30 beyond the extended position. The extension stop component 92 may include one or more front tabs protruding outwardly from the first and/or second sides 34a, 34b of the cargo box 30 adjacent the front end of the cargo box 30. In use, the guide 70a may engage the extension stop component 92 in the extended position, which may restrict or prevent further movement of the cargo box 30 outward from the cargo bed 14.

The retraction stop component 90 and the extension stop component 92 may be made of rubber, plastics, or other suitable materials, and may be secured to the rails 74 or other portions of the cargo box 30 using bolts, screws, or other fasteners.

In various embodiments, some or all of the structural members as generally described herein may be made of a metal, such as steel or aluminum. For example, some or all of the structural members may be manufactured as extruded aluminum components. In other embodiments, some or all of the structural members may be made of other suitable materials (e.g. rigid plastics, composites, etc.). In general, use of extruded components can enable easy assembly/disassembly, and can help reduce shipping size.

In some embodiments, the cargo box assembly 10 may include a modular set of components. For example, the cargo box 30 may be assembled from various extrusions or other modular structural members. The modular structural members may include: deck extrusions that assemble to form the base 32; roller channel extrusions 62 that form part of the base 32 and house the linear wheel assemblies 40; sidewall extrusions that assemble to form sidewalls along the sides 34, front end 36, and rear end 38 of the cargo box 30; corner brackets that secure ends of the sidewalls together; divider extrusions for providing one or more lateral or longitudinal dividers 39 within the cargo box 30; and other hardware such as the baseplate 76 and angle brackets 82, 84 that form the guides 70 for securing the cargo box 30 to the cargo bed 14.

Some of the modular structural members may interlock together using edges and/or channels that fit together. Some of the modular structural members may be predrilled for assembly using fasteners such as screws, bolts, and nuts. Some of the modular structural members may be assembled using self-drilling screws such as wafer head TEK™ screws.

The modular set of components may allow customized sizing of the cargo box for trucks and vehicles having different shapes and sizes.

In general, the cargo box assembly 10 is mounted between the side rails 16 of the cargo bed 14. In some cases, the cargo box assembly 10 may be sized to span substantially the entire width between the side rails 16, or a portion thereof. Furthermore, the cargo box assembly 10 may be sized to span substantially the entire length and/or height of the cargo bed 14, or a portion thereof.

While the illustrated embodiment shows one cargo box assembly 10 within the cargo bed 14, there may be a plurality of cargo box assemblies 10 mounted to the cargo bed 14.

In some embodiments, some or all of the structural members of the cargo box assembly 10 may undergo a finishing process. For example, structural members may be anodized, powder coated, and/or provided with polished finish. Such finishes may tend to provide for a complete and polished appearance, and may further protect the cargo box assembly 10 from weather and other effects. Such finishes may also help provide smooth gliding surfaces for movement of the cargo box 30.

In some embodiments, the cargo box assembly 10 could also be used for various loading and unloading operations, and may be used to transport or store objects (e.g. tools and toolboxes) in a generally secure manner.

In some embodiments, the various structural members of the cargo box assembly 10 (e.g. the base 32, sidewalls, roller channel extrusions 62, rails 74, etc.) can be flat-packed so as to facilitate shipping (e.g. using shipping cartons of configurations that are volumetrically efficient). Once at the desired destination (e.g. a dealer, a distributor, a consumer), the structural members can be easily assembled so as to provide the completed cargo box assembly 10.

While the above description provides examples of one or more apparatus, methods, or systems, it will be appreciated that other apparatus, methods, or systems may be within the scope of the claims as interpreted by one of skill in the art.

The invention claimed is:

1. A retractable cargo box assembly for a cargo bed of a vehicle, the vehicle having a tailgate hingedly coupled to the cargo bed and moveable between an upright position and a downward position, the retractable cargo box assembly comprising:
   a) a cargo box including a base extending laterally between a first side and a second side, and extending longitudinally between a front end and a rear end; and
   b) a linear wheel assembly mounted to the base, the linear wheel assembly including a plurality of rollers aligned in a linear arrangement between the front end and the rear end of the base, the rollers being configured to rotatably support the cargo box on the cargo bed of the vehicle;
      wherein the cargo box is movable between a retracted position in which the cargo box is rotatably supported by the rollers on an upper surface of the cargo bed and an extended position in which the tailgate is in the downward position and the rollers are in direct contact with an upper surface of the tailgate to rotatably support the cargo box on the tailgate; and
      wherein the rollers that are in contact with the upper surface of the tailgate are unguided.

2. The retractable cargo box assembly of claim 1, wherein each roller has a roller diameter, and each roller is spaced apart in the linear arrangement by a separation distance that is less than the roller diameter.

3. The retractable cargo box assembly of claim 1, wherein the plurality of rollers includes at least three rollers aligned in a linear arrangement.

4. The retractable cargo box assembly of claim 1, wherein the rollers of the linear wheel assembly are aligned along a longitudinal axis and each roller has a rotational axis orthogonal to the longitudinal axis.

5. The retractable cargo box assembly of claim 1 wherein the linear wheel assembly includes a plurality of linear wheel assemblies.

6. The retractable cargo box assembly of claim 5, wherein the plurality of linear wheel assemblies includes:
   a) a first linear wheel assembly positioned below the base adjacent the first side; and
   b) a second linear wheel assembly positioned below the base adjacent the second side.

7. The retractable cargo box assembly of claim 6, further comprising a third linear wheel assembly positioned laterally between the first linear wheel assembly and the second linear wheel assembly.

8. The retractable cargo box assembly of claim 1, wherein the base of the cargo box includes a roller channel extrusion having a roller channel for receiving the linear wheel assembly therein.

9. The retractable cargo box assembly of claim 1, further comprising a guide securable to the cargo bed for guiding the cargo box between the retracted position and the extended position.

10. The retractable cargo box assembly of claim 9, wherein the guide includes a guide flange for securing the cargo box and the linear wheel assembly to the cargo bed.

11. The retractable cargo box assembly of claim 10, wherein the guide comprises:
   a) a baseplate securable to the cargo bed; and
   b) a guide bracket securable to the baseplate and extending upwardly therefrom, the guide bracket including the guide flange.

12. The retractable cargo box assembly of claim 11, wherein the baseplate is laterally adjustable along the cargo bed.

13. The retractable cargo box assembly of claim 11, wherein the cargo box includes a rail that engages the guide flange.

14. The retractable cargo box assembly of claim 1, wherein the guide includes a first guide along the first side of the cargo box, and a second guide along the second side of the cargo box.

15. The retractable cargo box assembly of claim 9, further comprising a retraction stop component for restricting movement of the cargo box beyond the retracted position.

16. The retractable cargo box assembly of claim 15, wherein the guide engages the retraction stop component in the retracted position.

17. The retractable cargo box assembly of claim 15, wherein the retraction stop component includes a set of rear tabs protruding outwardly from the first and second sides of the cargo box adjacent the rear end of the cargo box.

18. The retractable cargo box assembly of claim 9, further comprising an extension stop component for restricting movement of the cargo box beyond the extended position.

19. The retractable cargo box assembly of claim 18, wherein the guide engages the extension stop component in the extended position.

20. The retractable cargo box assembly of claim 18, wherein the extension stop component includes a set of front tabs protruding outwardly from the first and second sides of the cargo box adjacent the front end of the cargo box.

* * * * *